US012028670B2

(12) United States Patent
Bacon et al.

(10) Patent No.: US 12,028,670 B2
(45) Date of Patent: Jul. 2, 2024

(54) IN-EAR AUDIO OUTPUT DEVICE HAVING A STABILITY BAND DESIGNED TO MINIMIZE ACOUSTIC PORT BLOCKAGE

(71) Applicant: BOSE CORPORATION, Framingham, MA (US)

(72) Inventors: Cedrik Bacon, Ashland, MA (US); Sean Patterson, Allston, MA (US); Donna Marie Sullivan, Millbury, MA (US); Christopher Ratcliffe, Williamsburg, VA (US)

(73) Assignee: BOSE CORPORATION, Framingham, MA (US)

( * ) Notice: Subject to any disclaimer, the term of this patent is extended or adjusted under 35 U.S.C. 154(b) by 190 days.

(21) Appl. No.: 17/574,744

(22) Filed: Jan. 13, 2022

(65) Prior Publication Data

US 2023/0224617 A1 Jul. 13, 2023

(51) Int. Cl.
*H04R 1/10* (2006.01)

(52) U.S. Cl.
CPC ......... *H04R 1/1016* (2013.01); *H04R 1/1066* (2013.01); *H04R 1/1083* (2013.01)

(58) Field of Classification Search
CPC .... H04R 1/105; H04R 1/1066; H04R 5/0335; H04R 25/02; H04R 25/607; H04R 2225/77
See application file for complete search history.

(56) References Cited

U.S. PATENT DOCUMENTS

| | | | | |
|---|---|---|---|---|
| 5,659,156 A * | 8/1997 | Mauney | H04R 1/1016 381/328 |
| 7,536,008 B2 * | 5/2009 | Howes | H04R 1/083 381/380 |
| 7,664,287 B2 * | 2/2010 | Neu | H04R 1/105 381/381 |

(Continued)

FOREIGN PATENT DOCUMENTS

WO 2022000003 A1 1/2022

OTHER PUBLICATIONS

International Search Report and Written Opinion for International Application No. PCT/US2023/010780 Mailed Jul. 14, 2023.

(Continued)

*Primary Examiner* — Ryan Robinson
(74) *Attorney, Agent, or Firm* — Patterson + Sheridan, LLP

(57) ABSTRACT

Aspects describe an in-ear audio output device. The in-ear audio output device includes an acoustic chamber defined by an earbud housing shaped to fit in the lower concha of an ear of a wearer of the in-ear audio output device, the earbud housing comprising: a resistive port located on a first side of the earbud housing creating an opening in a wall of the earbud housing and a first feedforward microphone located on a second side of the earbud housing, the second side substantially opposite the first side of the earbud housing; and a stability band. The stability band includes at least one attachment feature that couples the stability band to the earbud housing and a first side substantially opposite the (Continued)

attachment feature that only partially covers the resistive port when the in-ear audio output device is positioned in the ear of the wearer.

19 Claims, 9 Drawing Sheets

(56) References Cited

U.S. PATENT DOCUMENTS

| | | | | |
|---|---|---|---|---|
| 8,374,375 | B2 * | 2/2013 | Hu | H04R 1/105<br>381/328 |
| 9,549,238 | B2 * | 1/2017 | Lott | H04R 1/1016 |
| 9,900,687 | B2 * | 2/2018 | Sørensen | H04R 1/105 |
| 10,034,078 | B2 * | 7/2018 | Silvestri | H04R 1/1091 |
| 10,587,947 | B2 * | 3/2020 | Kelley | H04R 1/105 |
| 10,602,255 | B2 * | 3/2020 | Sandanger | H04R 1/10 |
| 10,674,248 | B2 * | 6/2020 | Wei | H04R 1/1058 |
| 10,820,085 | B1 * | 10/2020 | Sandanger | H04R 1/105 |
| 10,827,252 | B2 * | 11/2020 | Trainer | H04R 1/105 |
| 11,172,286 | B2 * | 11/2021 | Bai | H04R 1/105 |
| 11,218,794 | B2 * | 1/2022 | Bai | H04R 1/1058 |
| 11,700,476 | B2 * | 7/2023 | Holley | H04R 1/105<br>381/381 |
| 2013/0195310 | A1 * | 8/2013 | Lin | H04R 1/1058<br>381/380 |
| 2014/0286515 | A1 | 9/2014 | Bone et al. | |
| 2015/0350761 | A1 * | 12/2015 | Heim | H04R 1/105<br>264/222 |
| 2018/0242068 | A1 | 8/2018 | Kelley et al. | |
| 2020/0221200 | A1 * | 7/2020 | Sandanger | H04R 1/1016 |
| 2020/0221201 | A1 | 7/2020 | Zalisk et al. | |
| 2020/0344539 | A1 | 10/2020 | Sandanger et al. | |
| 2021/0104217 | A1 | 4/2021 | Liu et al. | |
| 2021/0377640 | A1 * | 12/2021 | Zalisk | H04R 1/1091 |
| 2021/0377643 | A1 * | 12/2021 | Igarashi | H04R 1/42 |
| 2022/0182747 | A1 * | 6/2022 | Zalisk | H04R 1/1083 |
| 2022/0248120 | A1 * | 8/2022 | Ito | H04R 1/1016 |

OTHER PUBLICATIONS

Invitation to Pay Additional Fees for International Application No. PCT/US2023/010780 Mailed May 9, 2023.

* cited by examiner

100B

100C

IN-EAR AUDIO OUTPUT DEVICE HAVING A STABILITY BAND DESIGNED TO MINIMIZE ACOUSTIC PORT BLOCKAGE

FIELD

Aspects of the present disclosure describe various features of an in-ear audio output device having a stability band and one or more acoustic ports. As described in more detail herein, the stability band is designed to both hold the in-ear audio output device firmly in place and ensure the one or more acoustic ports are free of complete blockage.

BACKGROUND

Various in-ear audio output devices (referred to herein as "audio devices") incorporate active noise reduction (ANR) features, also known as active noise control or cancellation (ANC), in which one or more microphones detect sound, such as exterior acoustics captured by a feedforward microphone or interior acoustics captured by a feedback microphone. Signals from a feedforward microphone and/or a feedback microphone are processed to provide anti-noise signals to be fed to an acoustic transducer (e.g., a speaker, a driver) to counteract noise that may otherwise be heard by a user.

Such audio devices may also have small vent holes, namely acoustic ports, on the outside surface of the housing. The acoustic ports may be used to improve acoustic output of the audio device, equalize the audio response, and provide a venting path during overpressure events for the acoustic transducer. The likelihood of interference to such ports continues to increase as audio devices reduce in size.

SUMMARY

Aspects provide an in-ear audio output device. In an aspect, the in-ear audio output device comprises an acoustic chamber defined by an earbud housing shaped to fit in the lower concha of an ear of a wearer of the in-ear audio output device, the earbud housing comprising: a resistive port located on a first side of the earbud housing creating an opening in a wall of the housing to couple the acoustic chamber with space outside the earbud housing; and a first feedforward microphone located on a second side of the earbud housing, the second side substantially opposite the first side of the earbud housing; and a stability band comprising: at least one attachment feature that couples the stability band to the earbud housing and includes an opening which aligns with the resistive port to couple the acoustic chamber with space outside the stability band; and a first side substantially opposite the attachment feature that only partially covers the resistive port when the in-ear audio output device is positioned in the ear of the wearer causing the first side of the stability band to fold under anti-tragus of the ear of the wearer and towards the attachment feature.

In aspects, the in-ear audio output device further comprises a nozzle coupled to an external surface of the earbud housing and extending towards an ear canal of the ear of the wearer and comprising a planar, distal end, the nozzle including an acoustic passage to conduct sound waves to the ear canal of the wearer; and a substantially spherical dome shaped sealing structure extending from the planar, distal end of the nozzle.

In aspects, the second side of the earbud housing including the feedforward microphone being substantially opposite the first side of the earbud housing including the resistive port comprises the second side of the earbud housing including the first feedforward microphone being longitudinally opposite the first side of the earbud housing including the resistive port such that the first feedforward microphone sits in a concha cymba of the ear of the wearer and the resistive port sits in a concha cavum of the ear of the wearer and is aligned with an intertragal notch of the ear of the wearer.

In aspects, the resistive port is covered by a material providing an acoustical resistance.

In aspects, the resistive port comprises a stadium shape having a maximum length between approximately 1 millimeter and approximately 3 millimeters.

In aspects, the at least one attachment feature of the stability band is shaped to span an outer perimeter of the earbud housing.

In aspects, the opening is tapered from a first side of the attachment feature distal to the earbud housing to a second side of the attachment feature proximal to the earbud housing such that: at the first side of the attachment feature, the opening comprises a first maximum length greater than a maximum length of the resistive port and a first maximum height greater than a maximum height of the resistive port and at the second side of the attachment feature, the opening comprises a second maximum length equal to the maximum length of the resistive port and a second maximum height equal to the maximum length of the resistive port. In aspects, the first maximum length is between approximately 2 millimeters and approximately 4 millimeters and the second maximum length is between approximately 1 millimeter and approximately 3 millimeters.

In aspects, the stability band further comprises a first cantilevered portion shaped to flexibly fit under an anti-helix of the ear of the wearer and a second cantilevered portion shaped to flexibly fit under the anti-tragus, wherein the second cantilevered portion comprises: a second side of the stability band coupled to the attachment feature; and the first side of the stability band, wherein the first side of the stability band is substantially opposite the second side of the stability band. In aspects, the second cantilevered portion includes at least one of: horizontal ribs or vertical ribs.

In aspects, a height of the first side of the stability band decreases along a length of the first side of the stability band such that when the first side folds under the anti-tragus and towards the attachment feature when the in-ear audio output device is positioned in the ear of the wearer, the resistive port is not blocked by the first side of the stability band.

In aspects, the decrease in the height of the first side of the stability band is variable such that the decrease in the height of the first side of the stability band increases along the length of the first side of the stability band.

In aspects, the stability band is removable from the in-ear audio output device.

In aspects, the in-ear audio output device further comprises a mass port located on the second side of the earbud housing, wherein the mass port is located on a same plane as the first feedforward microphone.

In aspects, the in-ear audio output device further comprises a body coupled to an external surface of the earbud housing extending away from an ear canal of the ear of the wearer and a second feedforward microphone located on the body, the second feedforward microphone being longitudinally opposite the first side of the earbud housing including the resistive port such that the second feedforward microphone is near a concha cymba of the ear of the wearer and the resistive port sits in a concha cavum (234) of the ear of the wearer and is aligned with an intertragal notch of the ear of the wearer. In aspects, when the in-ear audio output device is positioned in the ear of the wearer the second feedforward microphone is outside the ear.

Aspects provide a stability band for an in-ear audio output device. In an aspect, the stability band for the in-ear audio output device comprises at least one attachment feature that couples the stability band to an earbud housing of the in-ear audio output device, wherein the attachment feature includes an opening which aligns with an intertragal notch and a first side substantially opposite the attachment feature, wherein a height of the first side decreases along a length of the first side.

In aspects, the at least one attachment feature is shaped to span an outer perimeter of an earbud housing of the in-ear audio output device.

In aspects, the opening is tapered from a first side of the at attachment feature to a second side of the attachment feature such that: at the first side of the attachment feature, the opening comprises a first maximum length and a first maximum height and at the second side of the attachment feature, the opening comprises a second maximum length and a second maximum height, wherein the first maximum length is greater than the second maximum length and the first maximum height is greater than the second maximum height. In aspects, the first maximum length is between approximately 2 millimeters and approximately 4 millimeters and the second maximum length is between approximately 1 millimeter and approximately 3 millimeters.

In aspects, the stability band for the in-ear audio output device further comprises a first cantilevered portion shaped to flexibly fit under an anti-helix of an ear of a wearer of the in-ear audio output device and a second cantilevered portion shaped to flexibly fit under an anti-tragus of the ear of the wearer, wherein the second cantilevered portion comprises: a second side coupled to the attachment feature and the first side, wherein the first side is substantially opposite the second side. In aspects, the second cantilevered portion includes at least one of: horizontal ribs or vertical ribs.

In aspects, the decrease in the height of the first side is variable such that the decrease in the height of the first side increases along the length of the first side.

All examples and features mentioned herein can be combined in any technically possible manner. Other features, objects, and advantages will become apparent from the following detailed description, when read in connection with the following drawing.

DETAILED DESCRIPTION

Figure 1A:
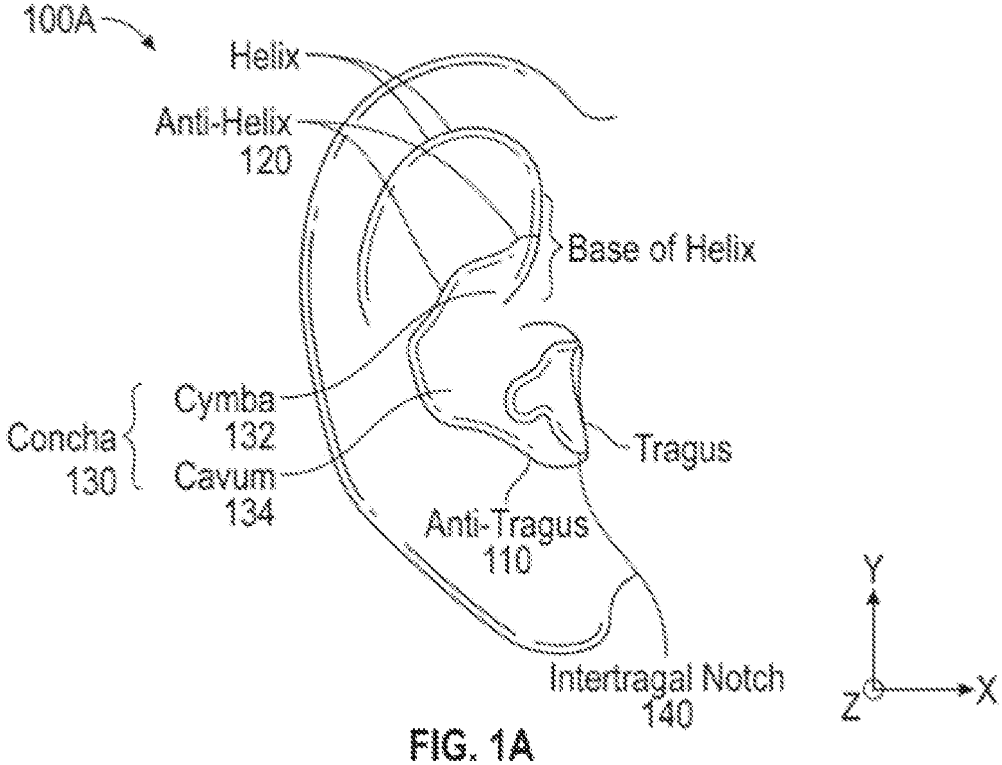
FIG. 1A is a view of the lateral surface of the human ear.

In-ear audio output devices use drivers (e.g., acoustic transducers, speakers) to convert electrical signals into sound. One basic type of driver comprises a coil of wire, called a voice coil, attached to the apex of a cone or dome shaped diaphragm. The voice coil is positioned in a permanent magnetic field, created, for example, by a pair of permanent magnets. Electrical current is passed through the voice coil, turning the voice coil into an electromagnet. The force generated by the fields of the electromagnet and the permanent magnets moves the voice coil back and forth, which in turn moves the diaphragm. The movement of the diaphragm creates longitudinal pressure waves in the air, which are perceived by our ears and brain as sound.

The sound quality produced is highly dependent on the design of its driver(s), and more specifically, on their ability to move air. In general, the easier it is for the driver to move back and forth, the more air the driver can move. This is especially important at lower frequencies (perceived as bass), which require more extreme movements of the driver.

To make it easier for the speaker to move, audio devices are designed to have small vent holes or "acoustic ports" on the outside surface of the housing that couple the acoustic chamber (housing the driver) to an area outside the device. The acoustic ports allow air to move in behind the driver when the driver pushes air towards the ear, and allow air to move back out when the driver moves away from the ear. By making it easier for the speaker to move, the ports improve sound quality. Further, by allowing air to flow in and out of the driver, the acoustic ports help to prevent pressure from building up, thereby allowing the driver to move more freely. Additionally, the acoustic ports help to equalize the audio response.

Due to the small size of the ports and size constraints of wearable audio output devices, ports are easily susceptible to blockage. For example, when the audio device is placed in a wearer's ear, one or more of the acoustic ports may be obstructed given the geometry of the wearer's ear thereby preventing air from flowing in and out of the acoustic chamber. As another example, additional features added to modern in-ear audio output devices to increase stability and comfortability may, in some cases, be placed in positions which cover existing acoustic ports of the audio device.

When one or more of the acoustic ports become blocked, the acoustic response of the audio device may deviate significantly from what is expected. The audio device may not be designed to compensate for such deviation; thus, the blocked acoustic ports may create unstable conditions, and in some cases, result in a feedback-like squealing sound.

The likelihood of interference to such acoustic ports by the body of a wearer of the audio device continues to increase as audio devices reduce in size. Further, the addition of physical features to ensure the audio device remains stable and comfortable to a wearer are also more likely to result in blockage of the acoustic ports. Accordingly, it is desirable to design in-ear audio devices that comfortably stay in a wearer's ear while also preventing complete air blockage to acoustic ports on the device.

Accordingly, aspects of the present disclosure provide an in-ear audio output device having a stability band designed to minimize acoustic port blockage. The described stability band is designed to ensure one or more acoustic ports of the audio device are free from complete blockage (e.g., no leak paths from inside an earbud housing of the audio device, defining an acoustic chamber, to space outside the earbud housing exist) for various ear geometries and sizes. As described below with respect to FIGS. 1A and 1B, the precise geometry of the human ear varies widely from individual to individual.

In particular, the stability band includes an attachment feature that couples or otherwise attaches the stability band to an earbud housing of an audio device having an acoustic port. The acoustic port creates an opening in the wall of the earbud housing to couple an acoustic chamber (e.g., defined by the earbud housing) with space outside the earbud housing. In aspects, the attachment feature includes an opening aligned with the acoustic port on the earbud housing to couple the acoustic chamber of the audio device with space outside the stability band. Further, in aspects, a first side of the stability band, substantially opposite the attachment feature is slanted such that when the audio device is positioned in a wearer's ear thereby causing the slanted side to fold towards the acoustic port, the acoustic port is not completely blocked by the slanted side. In other words, the slanted side of the stability band is designed to provide space between the acoustic port and the wearer's ear while also obstructing less than all of the acoustic port thereby allowing air to flow in and out of the acoustic chamber at all times.

In aspects, the stability band further includes a first cantilevered portion shaped to flexibly fit under an anti-helix of a wearer's ear when the earpiece is worn and a second cantilevered portion shaped to flexibly fit under an anti-tragus of the wearer's ear when the earpiece is worn. The second cantilevered portion includes the first slanted side of the stability band, substantially opposite the attachment feature. In aspects, the cantilevered portions of the stability band described herein provide orientation and stability without excessive radial pressure. Orientation helps ensure the audio device is properly in the wearer's ear. Achieving stability refers to the earpiece staying in the wearer's ear with minimal movement when properly inserted. Accordingly, the described stability band helps the audio device house more electronics in a region around the wearer's concha and sit comfortably in the wearer's ear for long periods of time while the wearer engages in various activities.

In aspects, the audio device incorporates active noise control or cancellation (ANC) features, in which a feedforward microphone detects exterior acoustics that are then processed to provide anti-noise signals to be fed to an acoustic transducer (e.g., a speaker, a driver) to counteract noise that may otherwise be heard by a user. The acoustic port in the earbud housing may be located on a first side of the earbud housing that is substantially opposite a second side of the earbud housing having the feedforward microphone. In other words, the acoustic port is located in a first acoustic cavity and the feedforward microphone is located in a second acoustic cavity when the audio device is placed in the wearer's ear to minimize any noise the feedforward microphone might pick up from air flow in and out of the acoustic port. Thus, the location of the acoustic port is acoustically optimal relative to the location of the feedforward microphone.

The illustrated stability band and audio device are shown for a wearer's right ear. A stability band and audio device that is designed to fit in the wearer's left ear is a mirror image of the stability band and audio device described below, and operates according to the same principles.

FIG. 1A shows the lateral surface 100A of a human's right ear, with some features identified. There are many different ear sizes and geometries. Some ears have additional features that are not shown in FIG. 1A. Some ears lack some of the features that are shown in FIG. 1A. Some features may be more or less prominent than are shown in FIG. 1A.

In aspects, as mentioned, the stability band described herein includes a cantilevered feature which may be referred to as a scoop or flap. In certain aspects, the cantilevered feature includes at least a first cantilevered portion and a second cantilevered portion based on typical ear geometry. In certain aspects, the cantilevered feature includes only the second cantilevered portion. The first cantilevered portion fits under the anti-helix of a wearer's ear in the region 120 when the earpiece is worn. The second cantilevered portion fits under the anti-tragus of the wearer's ear in the region 110 when the earpiece is worn. In aspects, the cantilevered portions are integrally formed. The cantilevered portion applies pressure to the ear along the antitragus and, at least, a small lower portion of the antihelix. As a result, the stability band creates stability and pushes the audio device towards the wearer's ear canal. Additionally, the stability band supports an earbud housing that houses electronics along the bowl of the wearer's concha in the region 130.

In aspects, as mentioned, the earbud housing includes an acoustic port which creates an opening in the wall of the earbud housing to couple an acoustic chamber (e.g., defined by the earbud housing) with space outside the earbud housing. In aspects, the acoustic port is a resistive port. Although embodiments herein are described with respect to a resistive port, the acoustic port may be any type of port creating an opening in the earbud housing.

The earbud housing also includes a first feedforward microphone. In aspects, the first feedforward microphone is longitudinally opposite the resistive port. In particular, the first feedforward microphone sits in the wearer's concha cymba in region 132 while the resistive port sits in the wearer's concha cavum in region 134. As mentioned, opposite placement of the feedforward microphone and the resistive port on the earbud housing helps to minimize noise the feedforward microphone might pick up from air flow in and out of the acoustic port for better ANC.

Further, in aspects, the resistive port, when sitting in the wearer's concha cavum in region 134, is also aligned with the wearer's intertragal notch in region 140. The intertragal notch forms an incisure (e.g., region 140) in the auricular cartilage, separating the tragus from the lobe and antitragus. Accordingly, alignment of the resistive port with the wearer's intertagal notch is ideal given the indentation of the intertragal notch causes there to be little, or no, skin which may cause the stability band to be displaced towards the resistive port, further reducing the likelihood of completely obstructing the resistive port.

Figure 1B:
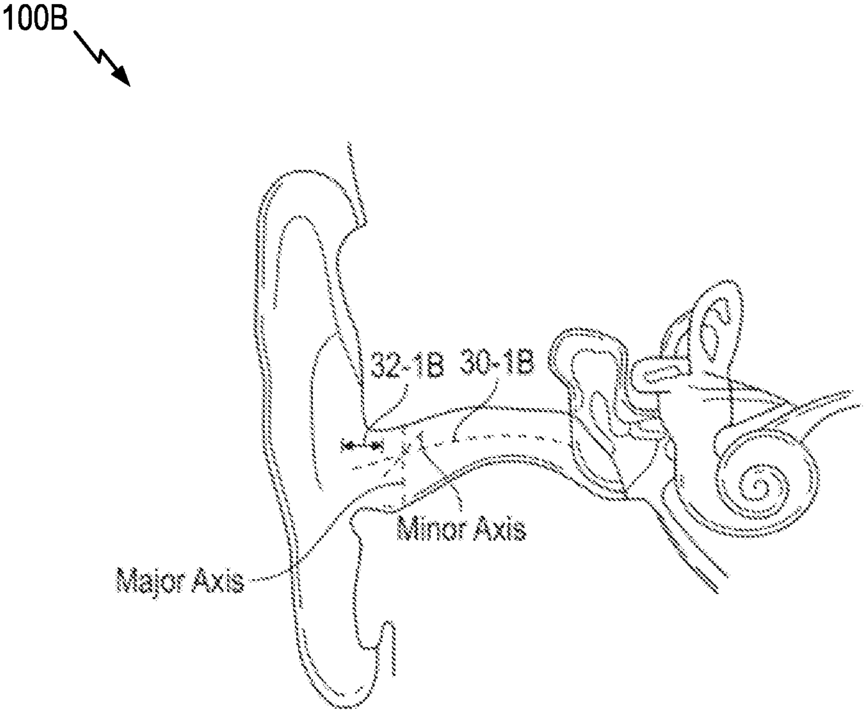
FIGS. 1B and 1C are exemplary cross-sections of the human ear.
Figure 1C:
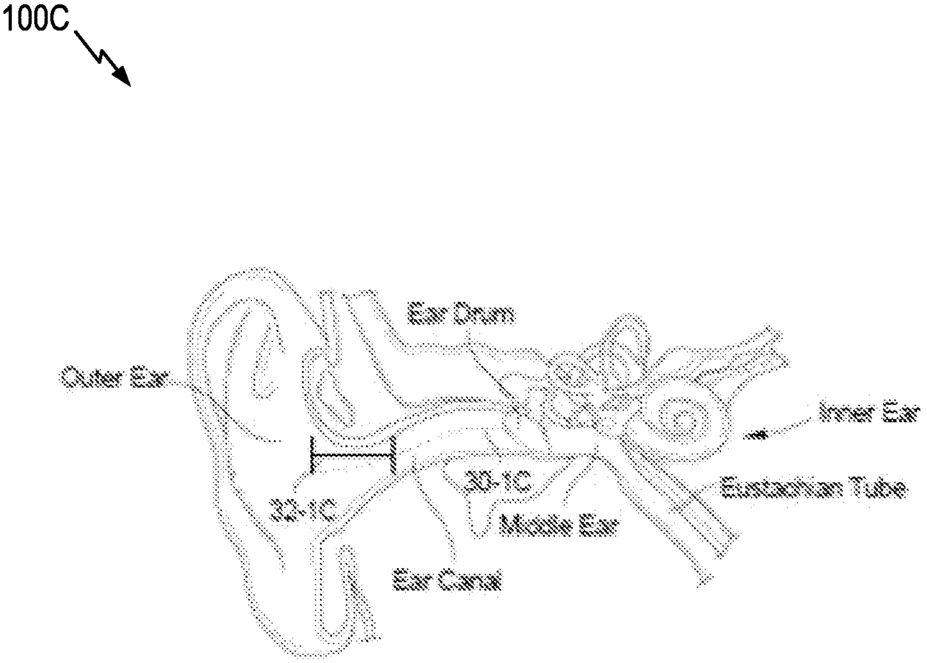

FIGS. 1B and 1C are exemplary cross-sections 100B and 100C, respectively, of the human ear, with some features identified. The ear canal is an irregularly shaped cylinder with a variable cross sectional area and a centerline that is not straight. Among the features identified is the entrance to the ear canal and the main portion of the ear canal. In this specification, the entrance to the ear canal refers to the portion of the ear canal near the concha where the walls of the ear canal are substantially non-parallel to the centerline of the ear canal. The precise structure of the human ear varies widely from individual to individual. For example, in the cross section of FIG. 1B, there is a relatively sharp transition from ear canal walls that are non-parallel to a centerline 30-1B of the ear canal to walls that are substantially parallel to a centerline of the ear canal, so the entrance 32-1B to the ear canal is relatively short. In the cross-section of FIG. 1C, there is a more gradual transition from walls that are non-parallel to a centerline of the ear canal to walls that are substantially parallel to a centerline 30-1C of the ear canal, so the entrance 32-1C to the ear canal is relatively long.

Figure 2:
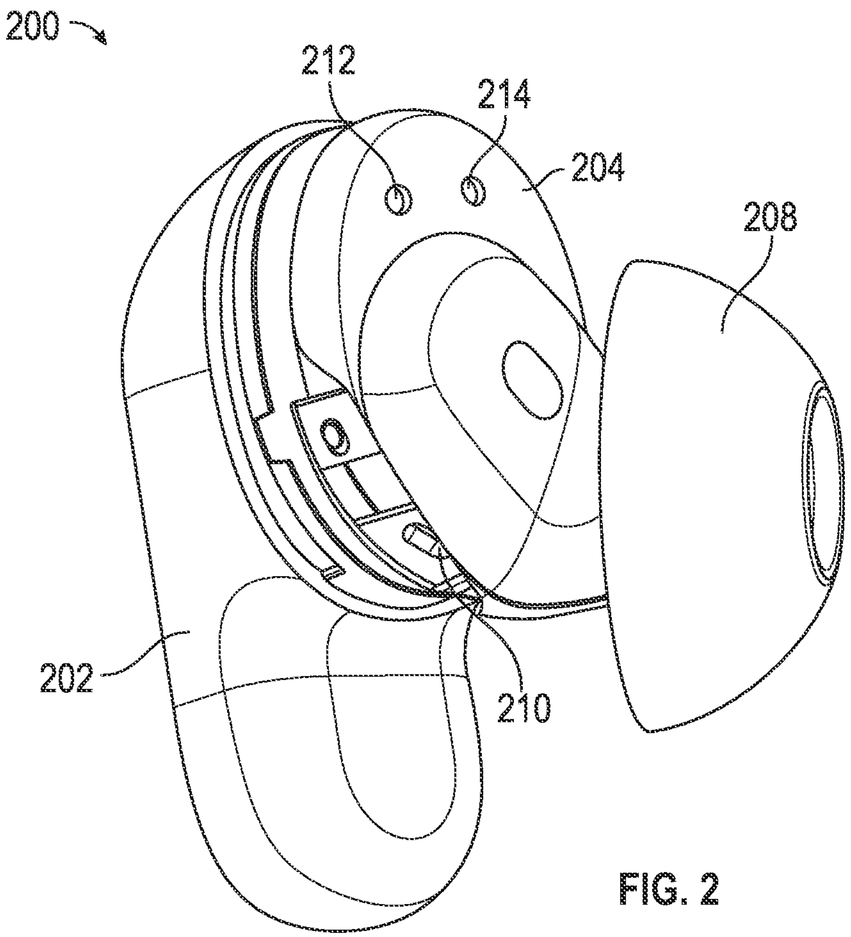
FIG. 2 is a side perspective of an in-ear audio output device including an earbud housing having acoustic ports, according to aspects of the present disclosure.

FIG. 2 is a side perspective 200 of an in-ear audio output device including an earbud housing having acoustic ports, including at least a resistive port. The in-ear audio output device (referred to herein as the "audio device") includes a body 202, an earbud housing 204, a nozzle 206 (not illustrated in FIG. 2), and a sealing structure 208. In aspects, earbud housing 204 is shaped to fit in and around a lower concha of a wearer of the audio device. Earbud housing 204 defines an acoustic chamber which houses the acoustic driver and other electronics for the audio device. In aspects, earbud housing 204 includes a resistive port 210 located on a first side of earbud housing 204 creating an opening in a wall of earbud housing 204 to couple the acoustic chamber with space outside earbud housing 204. Resistive port 210 is described in more detail with respect to FIG. 3.

In aspects, earbud housing 204 further includes a feedforward microphone 214 (referred to herein as "first feedforward microphone 214") located on a second side of earbud housing 204. The second side of earbud housing 204 including first feedforward microphone 214 is substantially opposite the first side of earbud housing 204 containing resistive port 210. In aspects, the second side of earbud housing 204 including first feedforward microphone 214 is longitudinally opposite the first side of earbud housing 204 including resistive port 210 such that first feedforward microphone 214 sits in the wearer's concha cymba and resistive port 210 sits in the wearer's concha cavum and is aligned with the wearer's intertragal notch.

Body 202 is coupled to an external surface of earbud housing 204 extending away from an ear canal of the ear of the wearer. In aspects, body 202 is shaped like a rectangular pill and is situated outside the wearer's ear when the audio device is worn. In aspects, body 202 sits against the outside of the wearer's ear, and in some cases, the wearer's face, to help hold the audio device in place in the ear. Although not illustrated in FIG. 2, body 202 may include a feedforward microphone 226 (referred to herein as "second feedforward microphone 226"). Second feedforward microphone 226 located on body 202 may be longitudinally opposite the first side of earbud housing 204 including resistive port 210 such that second feedforward microphone 226 is near the wearer's conch cymba and resistive port 210 sits in the wearer's concha cavum. Second feedforward microphone is illustrated in more detail in FIG. 4.

Nozzle 206 extends from earbud housing 204 towards sealing structure 208. In aspects, earbud housing 204 extends into nozzle 206, or in other words, forms part of nozzle 206. Nozzle 206 includes an acoustic passage for sound waves to pass to the ear canal of the wearer. In aspects, nozzle 206 has a planar end with a substantially elliptical-shaped opening. A major axis of the substantially elliptical-shaped opening is substantially aligned with a major axis of the wearer's ear canal (see FIGS. 1B and 1C) when the audio device is positioned in the wearer's ear. In certain other aspects, the opening is oval shaped or racetrack shaped.

Sealing structure 208 creates a seal with a typical wearer's ear canal. Sealing structure 208 is substantially spherically-dome shaped. Sealing structure 208 extends from the planar end of nozzle 206 and folds back towards the wearer's outer ear. Sealing structure 208 includes a narrow end coupled to nozzle 206 and a wider end that is larger than a typical ear canal is wide. There may be a soft, round connection between the narrow end of sealing structure 208 and the wider end of sealing structure 208. In an example, the connection between the narrow end and the wider end is described as pillow-shaped, dome-shaped, soft, and/or slightly curved. This type of connection places less pressure on the wearer's ear canal and decreases the force vector that pushes the audio device out of the wearer's ear canal.

In aspects, earbud housing 204 includes a mass port 212. The provision of one or both of mass port 212 and resistive port 210 enhance characteristics of the acoustic output of sounds by the acoustic driver. In aspects, mass port 212 is located on the second side of earbud housing 204, wherein the mass port is located on a same plane as the first feedforward microphone. As mentioned, the second side of earbud housing 204 including mass port 212 and first feedforward microphone 214 is substantially opposite the first side of earbud housing 204 containing resistive port 210.

Figure 3:
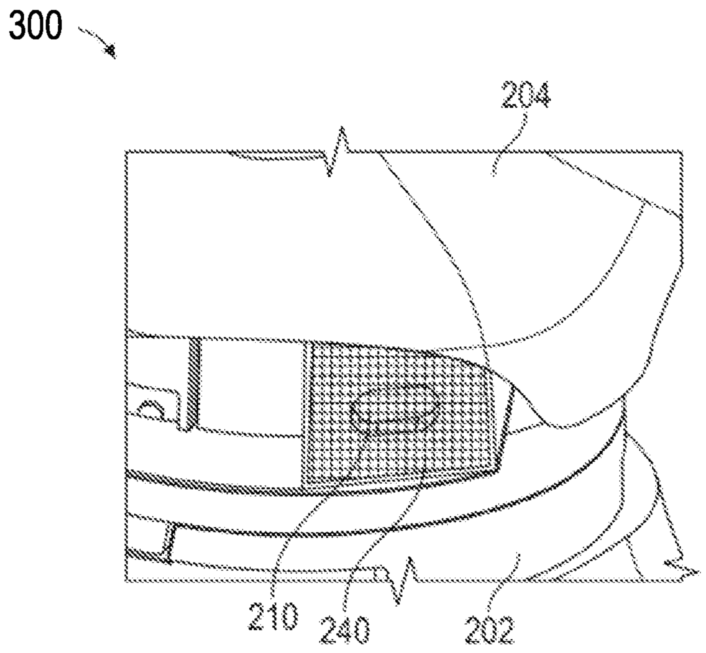
FIG. 3 is a front perspective of an acoustic port in the earbud housing, according to aspects of the present disclosure.

FIG. 3 is a front perspective 300 of resistive port 210 in earbud housing 204, according to aspects of the present disclosure. As illustrated in FIG. 3, resistive port 210 is essentially a hole in earbud housing 204 thereby allowing air to flow in and out of the acoustic chamber defined by earbud housing 204. As illustrated in FIG. 3, in certain aspects, resistive port 210 may comprise a stadium shape (e.g., a rectangle with semicircles at a pair of opposite sides). However, in other aspects, resistive port 210 may be substantially oval-shaped, substantially circular, substantially rectangular, etc. In aspects, resistive port 210 may have a maximum length between approximately 1 millimeter (mm) and approximately 3 mm. The size of resistive port 210 may be designed with dimensions which allow for the passage of air in and out of the acoustic chamber while preventing large particles and/or materials from entering the acoustic chamber.

In aspects, resistive port 210 is covered (completely or partially) by a resistive mesh 240. In some aspects, resistive mesh 240 is a material providing an acoustical resistance. For example, resistive mesh 240 may be a wire or fabric screen that allows some air and acoustic energy to pass through resistive port 210. In some aspects, resistive mesh 240 is a water, sweat, and/or dust proof screen.

Figure 4:
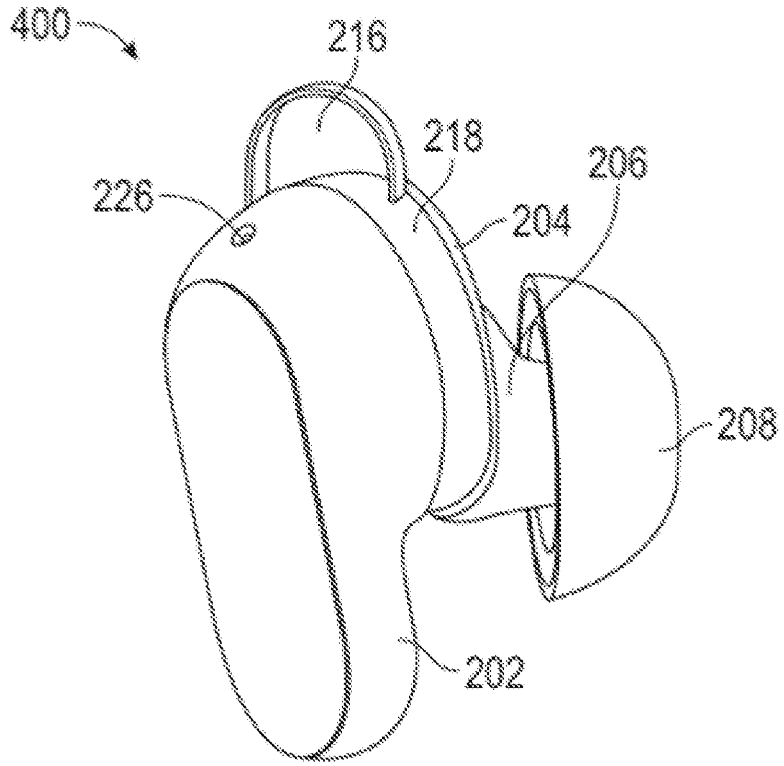
FIG. 4 is a side perspective of the in-ear audio output device including the earbud housing having acoustic ports and a stability band, according to aspects of the present disclosure.
Figure 5:
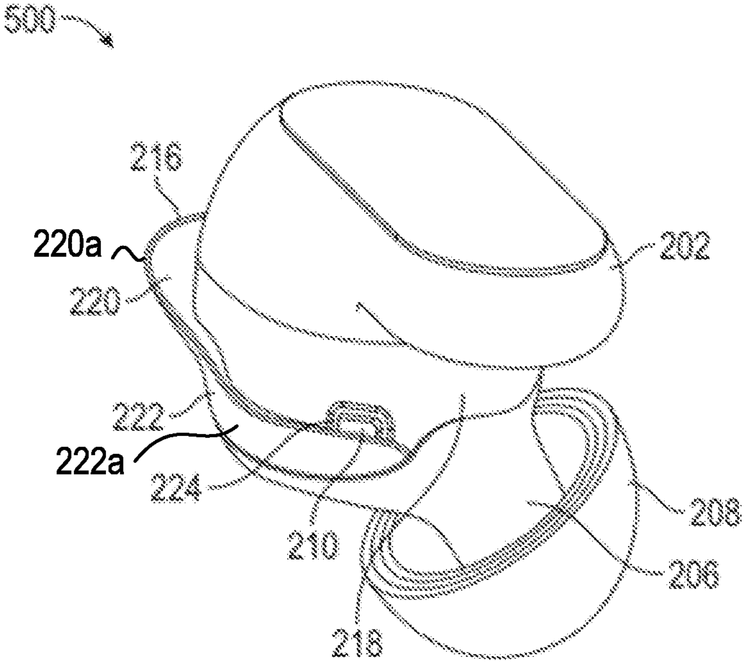
FIG. 5 is a bottom perspective of the in-ear audio output device including the earbud housing having acoustic ports and a stability band, according to aspects of the present disclosure.
Figure 6:
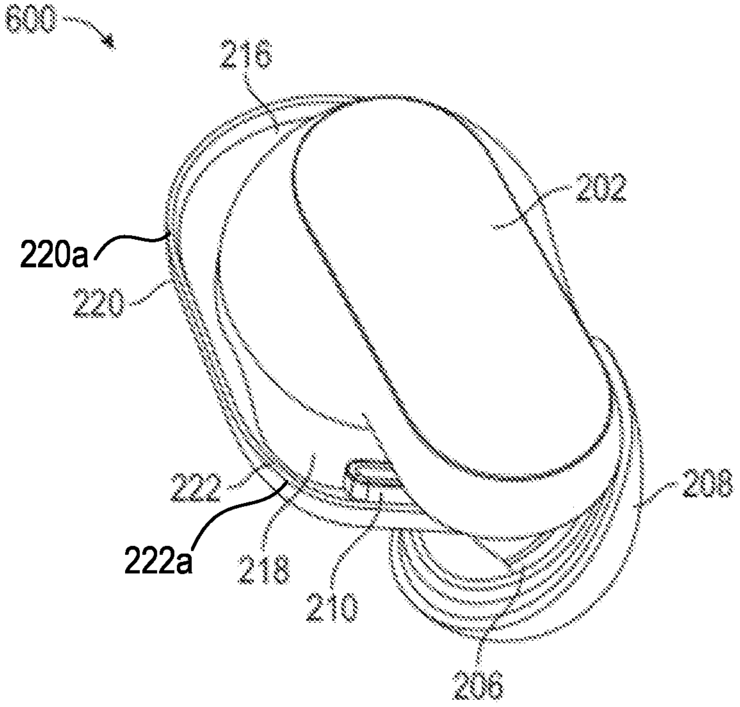
FIG. 6 is a back perspective of the in-ear audio output device including the earbud housing having acoustic ports and a stability band, according to aspects of the present disclosure.
Figure 7:
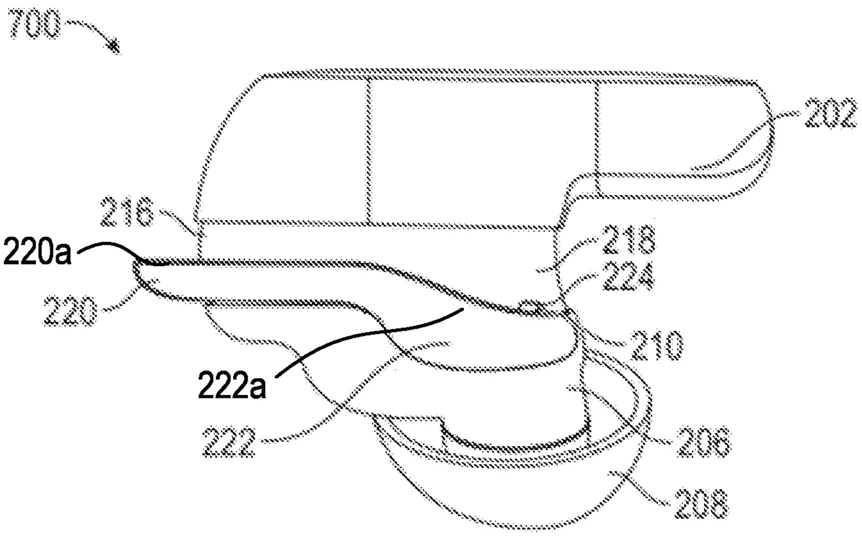
FIG. 7 is a side perspective of the in-ear audio output device including the earbud housing having acoustic ports and a stability band, according to aspects of the present disclosure.
Figure 8A:
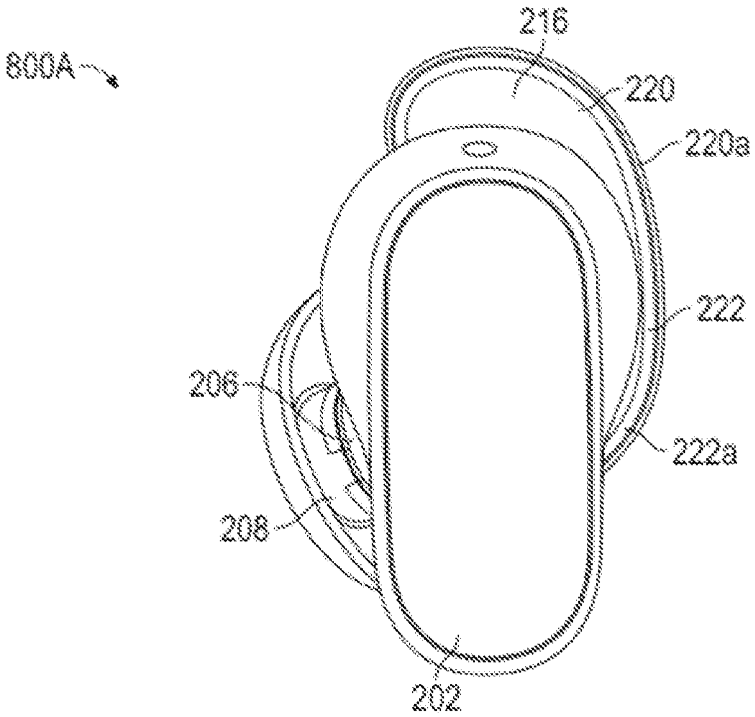
FIGS. 8A-8B are back perspectives of the in-ear audio output device including the earbud housing having acoustic ports and a stability band, according to aspects of the present disclosure.
Figure 8B:
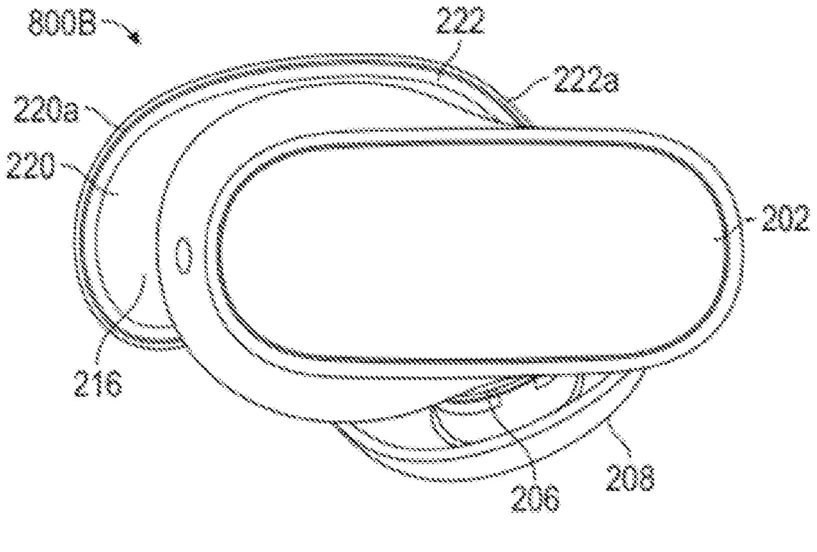

In aspects, the audio device may include a stability band. FIG. 4 is a side perspective 400 of the audio device including the earbud housing having acoustic ports, including at least the resistive port (not visible), and a stability band, according to aspects of the present disclosure. FIG. 5 is a bottom perspective 500 of the audio device including the earbud housing having acoustic ports, including at least a resistive port, and a stability band, according to aspects of the present disclosure. FIG. 6 is a back perspective 600 of the audio device including the earbud housing having acoustic ports, including at least a resistive port, and a stability band, according to aspects of the present disclosure. FIG. 7 is another side perspective 700 of the audio device including the earbud housing having acoustic ports, including at least a resistive port, and a stability band, according to aspects of the present disclosure. FIGS. 8A and 8B are back perspectives 800A and 800B, respectively, of the audio device including the earbud housing having acoustic ports and a stability band, according to aspects of the present disclosure.

As shown in FIGS. 4, 5, 6, and 7, stability band 216 may include an attachment feature 218 used to attach stability band 216 to the audio device, and more specifically, earbud housing 204. In aspects, stability band 216 is removably attached to earbud housing 204. In other words, attachment feature 218 allows stability band 216 to be removed and added to the audio device. In other aspects, attachment feature 218 is integrally formed with earbud housing 204.

In aspects, and as shown in FIGS. 4, 5, 6, and 7, attachment feature 218 is shaped to span an outer perimeter of earbud housing 204 of the audio device. In particular, attachment feature 218 may be a sleeve that fits around the outer perimeter of earbud housing 204. However, in other aspects not illustrated, attachment feature 218 is any feature that couples stability band 216 to earbud housing 204. In other words, attachment feature 218 does not have to span an outer perimeter of earbud housing 204. As an example, attachment feature 218 may snap or slide into a portion of an outer perimeter of earbud housing 204 to connect stability band 216 to earbud housing 204.

In aspects, attachment feature 218 includes an opening 224 which aligns with resistive port 210 on earbud housing 204 when stability band 216 is coupled to earbud housing 204. In particular, opening 224 provides a hole in stability band 216 which is used to couple the acoustic chamber with space outside stability band 216 when stability band 216 is coupled to earbud housing 204. In aspects, opening 224 is tapered from a first side of attachment feature 218 distal to earbud housing 204 to a second side of attachment feature 218 proximal to earbud housing 204. In other words, tapering opening 224 causes opening 224 to gradually narrow towards the second side of attachment feature 218 proximal to earbud housing 204. In aspects, opening 224 on the first side of attachment feature 218 (e.g., distal to earbud housing 204) comprises a first maximum length greater than a maximum length of the resistive port 210 and a first maximum height greater than a maximum height of the resistive port 210, while opening 224 on the second side of attachment feature 218 (e.g., proximal to earbud housing 204) comprises a second maximum length equal to the maximum length of resistive port 210 and a second maximum height equal to the maximum length of resistive port 210. The first maximum length may be between approximately 2 mm and approximately 4 mm, and the second maximum length may be between approximately 1 mm and approximately 3 mm.

In aspects, as shown in FIGS. 5, 6, 7, 8A, and 8B, stability band 216 includes a first side substantially opposite attachment feature 218. The first side of stability band 216 is a free-side that is more distant to attachment feature 218 and earbud housing 204, at least, when the earpiece is not inserted in a wearer's ear. In aspects, the first, free-side of stability band 216 is designed such that the first, free-side of stability band 216 only partially covers resistive port 210 when the audio device is positioned in the ear of the wearer causing the first, free-side of stability band 216 to fold towards attachment feature 218, and more specifically, opening 224 of attachment feature 218 aligned with resistive port 210. In particular, in aspects, a height of the first, free-side of stability band 216 may decrease along a length of the first, free-side of stability band 216 such that when the first, free-side folds towards attachment feature 218 when the audio device is positioned in the wearer's ear, resistive port 210 is not blocked by the first side of stability band 216. In other words, the first, free-side may be slanted downwards at different angles. In aspects, the decrease in the height of the first, free-side of stability band 216 is variable such that the decrease in the height of the first, free-side of stability band 216 increases along the length of the first, free-side of stability band 216. The design of the first, free-side of stability band 216 may be described in more detail with respect to FIGS. 12A-12C.

In aspects, the first, free-side substantially opposite attachment feature 218 is part of a second cantilevered portion 220 of stability band 216. In particular, in aspects, stability band 216 includes a first cantilevered portion 220 shaped to flexibly fit under the anti-helix of the wearer's ear and a second cantilevered portion 222 shaped to flexibly fit under the anti-tragus of the wearer's ear. In aspects, the first cantilevered portion 220 and the second cantilevered portion 222 are integrally formed.

Each of the first cantilevered portion 220 and the second cantilevered portion 222 include a first, free-side that is more distant to attachment feature 218 and earbud housing 204, at least, when the earpiece is not inserted in a wearer's ear. First, free-side 222*a* of second cantilevered portion 222 may have a height which decreases along a length of first, free-side 222*a* of second cantilevered portion 222 (e.g., is slanted downwards at different angles), as described above. Accordingly, first, free-side 222*a* of second cantilevered portion 222 may only partially cover resistive port 210 when the audio device is positioned in the ear of the wearer causing first, free-side 222*a* of second cantilevered portion 222 to fold under the wearer's anti-tragus towards attachment feature 218, and more specifically, towards opening 224 of attachment feature 218 aligned with resistive port 210.

Further, each of the first cantilevered portion 220 and the second cantilevered portion 222 include a second side that is proximate to attachment feature 218 and earbud housing 204. The first, free-side (e.g., labeled as 220*a*) and second side of first cantilevered portion 220, as well as the first, free-side (e.g., labeled as 222*a*) and second side of second cantilevered portion 222, are shown in more detail in FIGS. 10 and 11.

First cantilevered portion 220 and second cantilevered portion 222 have a scoop or curved shape, such that stability band 216 comfortably conforms to the shape of the wearer's anti-helix region 120 and anti-tragus region 110, respectively, when stability band 216 is attached to the audio device and the audio device is inserted in the wearer's ear. The curved shape allows the first, free-side of each of the cantilevered portions (e.g., first, free-side 220*a* and first, free-side 222*a*) to gently roll up towards attachment feature 218 and earbud housing 204 when first cantilevered portion 220 and second cantilevered portion 222 contact the anti-helix and anti-tragus, respectively. In this manner, stability band 216 secures the audio device for a wide range of ear geometries and sizes. If a wearer has a large ear, less of the free-side of the cantilevered portions may roll up towards the attachment feature 218 and earbud housing 204 when the audio device, with stability band 216, is inserted in the ear. If a user has a smaller ear, more of the free-side of the cantilevered portions may roll up towards attachment feature 218 and earbud housing 204 when the audio device, with stability band 216, is inserted in the ear. In both cases, however, the same stability band 216 comfortably provides stability to keep the audio device in place and properly oriented, and offers slight resistance when the wearer removes the audio device by pulling the audio device away from the ear canal.

Figure 9:
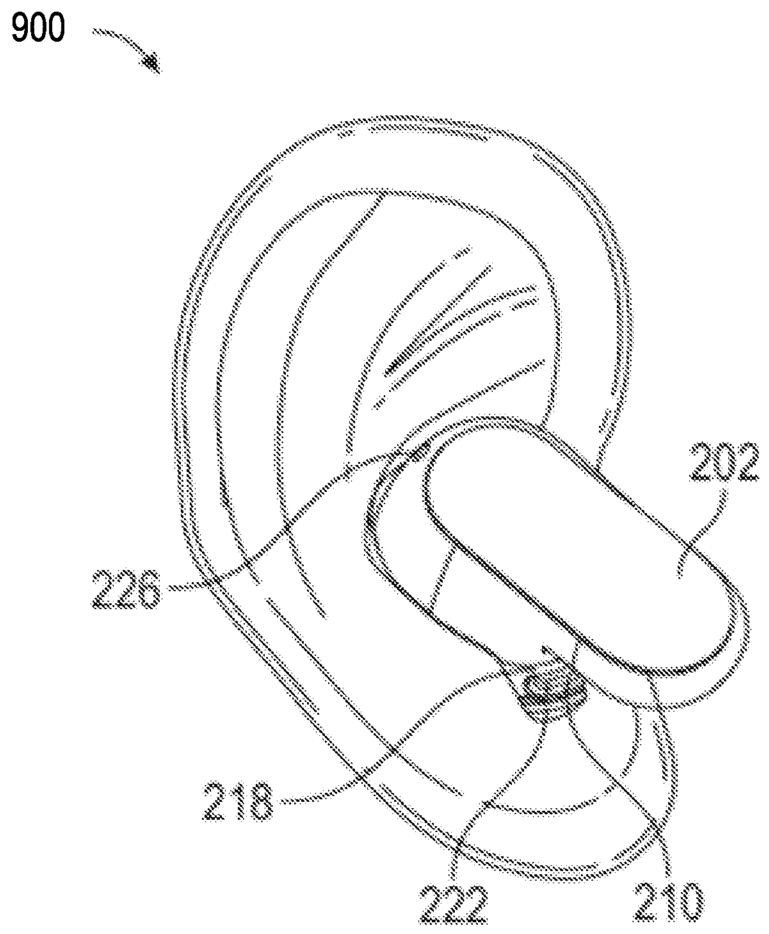
FIG. 9 is a back perspective of the in-ear audio output device including the earbud housing having acoustic ports and a stability band positioned in a wearer's ear, according to aspects of the present disclosure.

FIG. 9 is a back perspective 900 of the audio device including the earbud housing having acoustic ports, including at least a resistive port, and a stability band positioned in a wearer's ear, according to aspects of the present disclosure. As illustrated in FIG. 9, when the audio device is inserted in the wearer's ear, resistive port 210, and similarly opening 224 of stability band 216 are aligned with the intertragal notch of the ear of a wearer of the audio device. As mentioned, alignment of resistive port 210 (and opening 224) with the wearer's intertagal notch is ideal given the incisure of the intertragal notch causes there to be little, or no, skin which may cause the stability band to be displaced towards the resistive port, further reducing the likelihood of obstructing the resistive port, when the audio device is placed within the wearer's ear.

In FIG. 9, a small portion of first cantilevered portion 220 and a small portion of second cantilevered portion 222 are visible from a back perspective when the audio device is inserted in the wearer's ear. First cantilevered portion 220 is shaped to flexibly fit under the anti-helix of the ear of the wearer, and when first cantilevered portion 220 contacts the wearer's anti-helix, first, free-side 220*a* of first cantilevered portion 220 gently rolls up towards the attachment feature 218 (e.g., attachment feature is not illustrated in FIG. 8 as this feature cannot be seen when the audio device is placed in the wearer's ear). Similarly, second cantilevered portion 222 is shaped to flexibly fit under an anti-tragus of the ear of the wearer, and when second cantilevered portion 222 contacts the wearer's anti-tragus, first, free-side 222*a* of second cantilevered portion 222 gently rolls up toward attachment feature 218, and more specifically, towards resistive port 210 in earbud housing 204 and opening 224 in stability band 216. The outer ear blocks a view of the remainder of first cantilevered portion 220 and second cantilevered portion 222, not shown in FIG. 9, when the audio device, including stability band 216, is positioned in the wearer's ear.

In aspects, due to typical ear geometries, first cantilevered portion 220 and second cantilevered portion 222 are primarily on different planes. Second cantilevered portion 222 may sit deeper in the ear canal when the audio device is worn as compared to first cantilevered portion 220. In aspects, first side 222*a* of second cantilevered portion 222 is primarily on a first plane that is closer to the ear canal as compared to first side 220*a* of first cantilevered portion 220 when the earpiece is worn.

Further, as shown in FIG. 9, body 202, as well as second feedforward microphone 226, may be situated outside the wearer's ear when the audio device is positioned in the wearer's ear.

Figure 10:
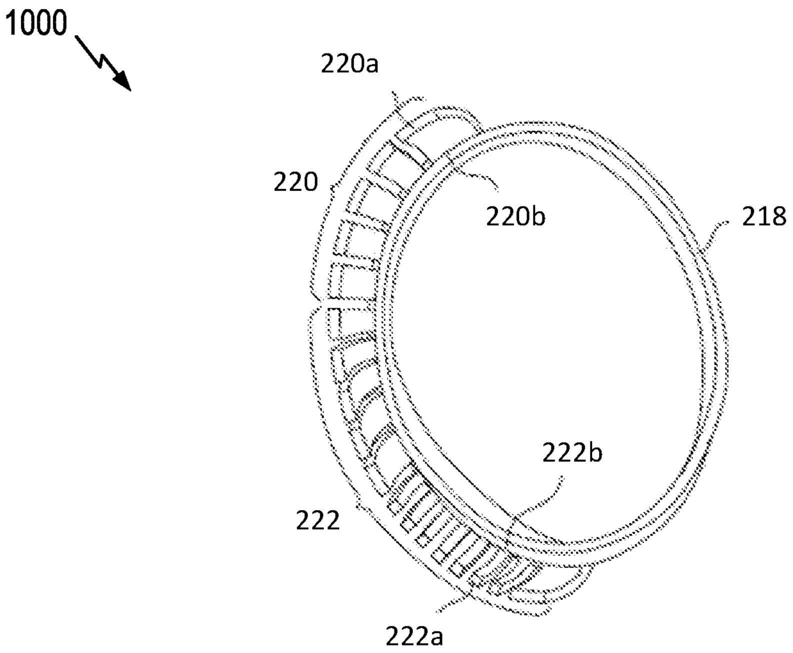
FIG. 10 is a front view of an example stability band, according to aspects of the present disclosure.
Figure 11:
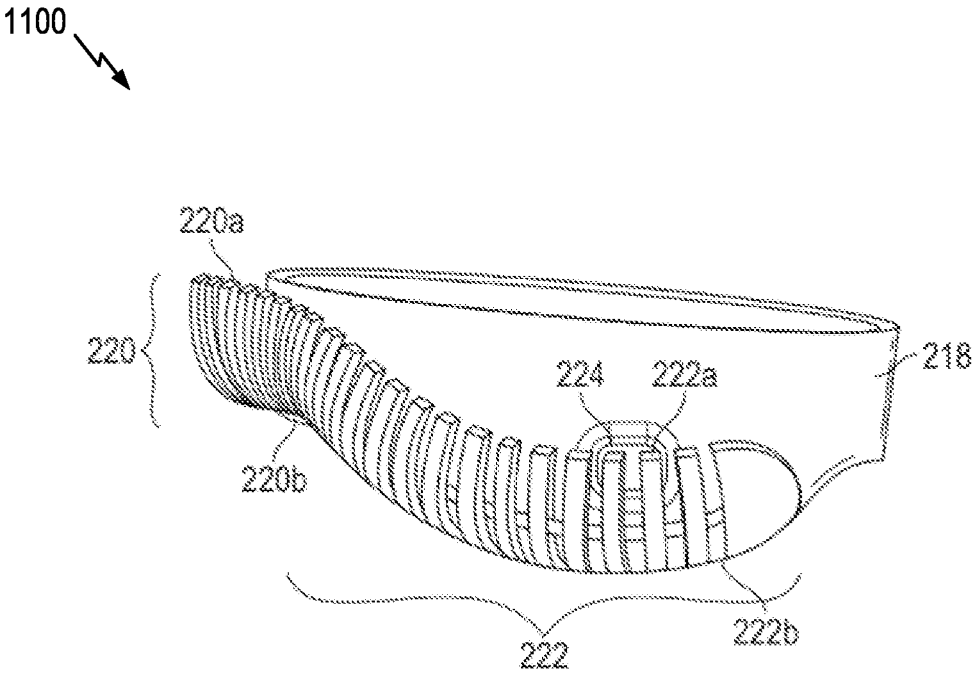
FIG. 11 is a side view of the example stability band, according to aspects of the present disclosure.

FIG. 10 is a front view 1000 of an example stability band, according to aspects of the present disclosure. FIG. 11 is a side view 1100 of the example stability band, according to aspects of the present disclosure.

As mentioned, each of the first and second cantilevered portions 220, 222 include a first and second side. In particular, as shown in FIG. 10, first cantilevered portion 220 includes a second side 220*b* that is coupled to attachment feature 218 and a first side 220*a* that folds towards second side 220*b* when the audio device, including the stability band, is inserted in a wearer's ear. Similarly, second cantilevered portion 222 includes a second side 222*b* and a first side 222*a* that folds towards second side 220*b* when the audio device is inserted in the wearer's ear. Second side 220*b* of first cantilevered portion 220 is coupled to attachment feature 218. Second side 222*b* of first cantilevered portion 222 is also coupled to attachment feature 218. In aspects, second side 220*b* of first cantilevered portion 220 and second side 222*b* of second cantilevered portion 222 are attached to attachment feature 218. In aspects, first cantilevered portion 220, the second cantilevered portion 220, and the attachment feature 218 are integrally formed. Further, opening 224 of attachment feature 218 may be more or less blocked by second side 222*b* of second cantilevered portion 222 as illustrated in FIG. 11.

As described above, first cantilevered portion 220 and second cantilevered portion 222 provide flexibility for a variety of ear sizes and geometries. In aspects, stability band 216 includes other features for increased flexibility and/or comfort.

As an example, as shown in FIGS. 10 and 11, one or more of the outer perimeter of the free, first sides 220*a* and 222*a* are not contiguous and instead include fringes (or fingers). The width of each finger need not be substantially the same. In one example, thinner fingers are used in areas where more flexibility is desired. In regions of the ear where there is a rapid change (e.g., curvature) in ear geometry or more variation from person to person, fringes provide flexibility for a single stability band 216 to fit most ears. While not illustrated, in aspects, only part of first cantilevered portion 220 or second cantilevered portion 222 includes fringes.

In other aspects, not illustrated in FIGS. 10 and 11, as an alternative to using fringes, stability band 216 is designed with flexible ribs. The flexible ribs may be horizontal or vertical. The flexible ribs are readily deformable by insertion of the audio device, including the stability band, into a wearer's ear. In regions of the ear where there is a rapid change (e.g., curvature) in ear geometry or more variation from person to person, flexible ribs provide flexibility for a single stability band 216 to fit most ears. In aspects, only part of first cantilevered portion 220 or second cantilevered portion 222 includes ribs.

In aspects, stability band 216 is made of any biocompatible material and has a varying thickness. In an example, a higher durometer material is used where less flexibility is desired. In regions where greater flexibility is desired, for example, due to varying ear geometry between people or a curved area of the ear, a lower durometer material may be used for increased flexibility.

The dual-planar stability band 216 has high compliance in the direction of the bud toward the ear canal and offers some stiffness in the vertical direction when the wearer attempts to rotate or remove the earpiece.

Figure 12A:
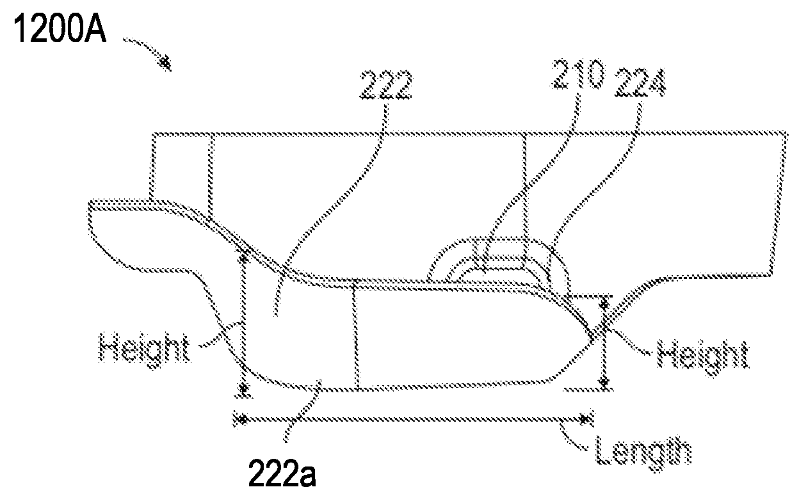
FIGS. 12A-12C are side perspectives of different stability band designs, according to aspects of the present disclosure.
Figure 12B:
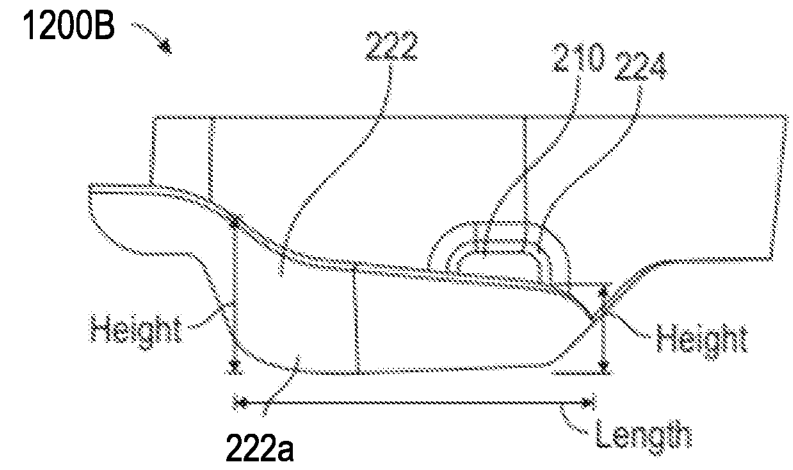
Figure 12C:
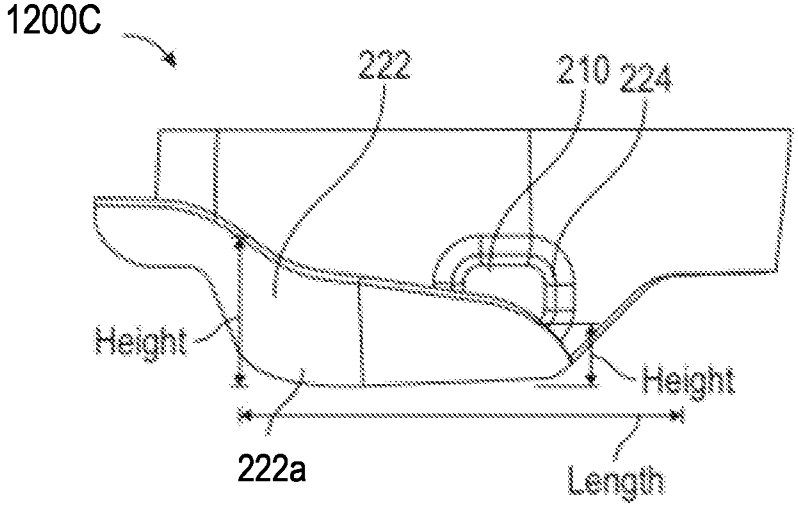

FIGS. 12A-12C are side perspectives 1200A, 1200B, and 1200C of different stability band designs, according to aspects of the present disclosure.

As mentioned previously, in aspects, first, free-side 222*a* of stability band 216 is designed such that first, free-side 222*a* only partially covers resistive port 210 when the audio device is positioned in the ear of the wearer causing first, free-side 222*a* to fold towards attachment feature 218, and more specifically, opening 224 of attachment feature 218 aligned with resistive port 210. Accordingly, as shown in FIGS. 12A-12C, a height of first, free-side 222*a* may decrease along a length of first, free-side 22*a*. In other words, first, free-side 222*a* may be slanted downwards at different angles as illustrated by FIGS. 12A-12C. Further, as shown, the decrease in the height of first, free-side 222*a* may be variable such that the decrease in the height of the first, free-side 222*a* increases along the length of first, free-side 222*a*.

The in-ear audio output device described herein is applicable to a variety of devices, including audio headphones, hearing aids, hearing assistance headphones, noise-masking earbuds, ANR headphones, aviation headphones, and other devices that include an in-ear component.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. An in-ear audio output device, comprising:

an acoustic chamber defined by an earbud housing shaped to fit in the lower concha of an ear of a wearer of the in-ear audio output device, the earbud housing comprising:
- a resistive port located on a first side of the earbud housing creating an opening in a wall of the earbud housing to couple the acoustic chamber with space outside the earbud housing; and
- a first feedforward microphone located on a second side of the earbud housing, the second side substantially opposite the first side of the earbud housing; and a stability band comprising:
- at least one attachment feature that couples the stability band to the earbud housing and includes an opening which aligns with the resistive port to couple the acoustic chamber with space outside the stability band; and
- a first side substantially opposite the attachment feature that only partially covers the resistive port when the in-ear audio output device is positioned in the ear of the wearer causing the first side of the stability band to fold under anti-tragus of the ear of the wearer and towards the attachment feature.

2. The in-ear audio output device of claim 1, further comprising:

a nozzle coupled to an external surface of the earbud housing and extending towards an ear canal of the ear of the wearer and comprising a planar, distal end, the nozzle including an acoustic passage to conduct sound waves to the ear canal of the wearer; and a substantially spherical dome shaped sealing structure extending from the planar, distal end of the nozzle.

3. The in-ear audio output device of claim 1, wherein the second side of the earbud housing including the feedforward microphone being substantially opposite the first side of the earbud housing including the resistive port comprises:

the second side of the earbud housing including the first feedforward microphone being longitudinally opposite the first side of the earbud housing including the resistive port such that the first feedforward microphone sits in a concha cymba of the ear of the wearer and the resistive port sits in a concha cavum of the ear of the wearer and is aligned with an intertragal notch of the ear of the wearer.

4. The in-ear audio output device of claim 1, wherein the resistive port comprises a stadium shape having a maximum length between approximately 1 millimeter and approximately 3 millimeters.

5. The in-ear audio output device of claim 1, wherein the at least one attachment feature of the stability band is shaped to span an outer perimeter of the earbud housing.

6. The in-ear audio output device of claim 1, wherein the opening is tapered from a first side of the attachment feature distal to the earbud housing to a second side of the attachment feature proximal to the earbud housing such that:

at the first side of the attachment feature, the opening comprises a first maximum length greater than a maximum length of the resistive port and a first maximum height greater than a maximum height of the resistive port; and at the second side of the attachment feature, the opening comprises a second maximum length equal to the maximum length of the resistive port and a second maximum height equal to the maximum length of the resistive port.

7. The in-ear audio output device of claim 1, wherein the stability band further comprises:

a first cantilevered portion shaped to flexibly fit under an anti-helix of the ear of the wearer; and a second cantilevered portion shaped to flexibly fit under the anti-tragus, wherein the second cantilevered portion comprises:
- a second side of the stability band coupled to the attachment feature; and
- the first side of the stability band, wherein the first side of the stability band is substantially opposite the second side of the stability band.

8. The in-ear audio output device of claim 7, wherein the second cantilevered portion includes at least one of: horizontal ribs or vertical ribs.

9. The in-ear audio output device of claim 1, wherein a height of the first side of the stability band decreases along a length of the first side of the stability band such that when the first side folds under the anti-tragus and towards the attachment feature when the in-ear audio output device is positioned in the ear of the wearer, the resistive port is not blocked by the first side of the stability band.

10. The in-ear audio output device of claim 9, wherein the decrease in the height of the first side of the stability band is variable such that the decrease in the height of the first side of the stability band increases along the length of the first side of the stability band.

11. The in-ear audio output device of claim 1, wherein the stability band is removable from the in-ear audio output device.

12. The in-ear audio output device of claim 1, further comprising:

a mass port located on the second side of the earbud housing, wherein the mass port is located on a same plane as the first feedforward microphone.

13. The in-ear audio output device of claim 1, further comprising:

a body coupled to an external surface of the earbud housing extending away from an ear canal of the ear of the wearer; and a second feedforward microphone located on the body, the second feedforward microphone being longitudinally opposite the first side of the earbud housing including the resistive port such that the second feedforward microphone is near a concha cymba of the ear of the wearer and the resistive port sits in a concha cavum (234) of the ear of the wearer and is aligned with an intertragal notch of the ear of the wearer.

14. The in-ear audio output device of claim 13, wherein when the in-ear audio output device is positioned in the ear of the wearer the second feedforward microphone is outside the ear.

15. A stability band for an in-ear audio output device comprising:

at least one attachment feature that couples the stability band to an earbud housing of the in-ear audio output device, wherein the attachment feature includes an opening which aligns with an intertragal notch; and a first side substantially opposite the attachment feature, wherein a height of the first side decreases along a length of the first side, wherein the decrease in the height of the first side is variable such that the decrease in the height of the first side increases along the length of the first side.

16. The stability band of claim 15, wherein the at least one attachment feature is shaped to span an outer perimeter of an earbud housing of the in-ear audio output device.

17. The stability band of claim 15, wherein the opening is tapered from a first side of the at attachment feature to a second side of the attachment feature such that:

at the first side of the attachment feature, the opening comprises a first maximum length and a first maximum height; and at the second side of the attachment feature, the opening comprises a second maximum length and a second maximum height, wherein the first maximum length is greater than the second maximum length and the first maximum height is greater than the second maximum height.

18. The stability band of claim 15, further comprising:

a first cantilevered portion shaped to flexibly fit under an anti-helix of an ear of a wearer of the in-ear audio output device; and a second cantilevered portion shaped to flexibly fit under an anti-tragus of the ear of the wearer, wherein the second cantilevered portion comprises:

a second side coupled to the attachment feature; and the first side, wherein the first side is substantially opposite the second side.

19. The stability band of claim 18, wherein the second cantilevered portion includes at least one of: horizontal ribs or vertical ribs.

* * * * *